(12) United States Patent
Vittu

(10) Patent No.: US 7,893,992 B2
(45) Date of Patent: Feb. 22, 2011

(54) DEVICE COMPRISING A CAMERA MODULE WITH AUTOMATIC FOCUSING AND CORRESPONDING ASSEMBLY METHOD

(75) Inventor: Julien Vittu, Voreppe (FR)

(73) Assignee: STMicroelectronics S.A., Montrouge (FR)

( * ) Notice: Subject to any disclaimer, the term of this patent is extended or adjusted under 35 U.S.C. 154(b) by 724 days.

(21) Appl. No.: 11/351,352

(22) Filed: Feb. 9, 2006

(65) Prior Publication Data

US 2006/0203095 A1    Sep. 14, 2006

(30) Foreign Application Priority Data

Feb. 10, 2005  (FR)  .................................. 05 01330

(51) Int. Cl.
*H04N 5/225*  (2006.01)
*H04N 5/232*  (2006.01)

(52) U.S. Cl. ........................ 348/374; 348/357
(58) Field of Classification Search ................. 348/374
See application file for complete search history.

(56) References Cited

U.S. PATENT DOCUMENTS

| | | | | |
|---|---|---|---|---|
| 5,506,401 | A * | 4/1996 | Segawa et al. | 250/208.1 |
| 7,046,296 | B2 * | 5/2006 | Shinomiya | 348/374 |
| 7,110,033 | B2 * | 9/2006 | Miyake | 348/340 |
| 7,268,816 | B2 * | 9/2007 | Yoshida et al. | 348/335 |
| 7,368,695 | B2 * | 5/2008 | Kang et al. | 250/208.1 |
| 2002/0113296 | A1 | 8/2002 | Cho et al. | |
| 2003/0146998 | A1 | 8/2003 | Doering et al. | |
| 2003/0156213 | A1 | 8/2003 | Doering et al. | |
| 2004/0119870 | A1 | 6/2004 | Yoshida et al. | |
| 2004/0201773 | A1 * | 10/2004 | Ostergard | 348/374 |
| 2005/0139848 | A1 * | 6/2005 | Yee | 257/98 |
| 2006/0092311 | A1 * | 5/2006 | Hartlove et al. | 348/340 |
| 2008/0049127 | A1 * | 2/2008 | Maeda et al. | 348/294 |

OTHER PUBLICATIONS

French Search Report from corresponding French Application No. 0501330, filed Feb. 10, 2005.
Patent Abstracts of Japan, vol. 017, No. 587 (E-1453), Oct. 26, 1993 & JP 05176208 Jul. 13, 1993.
Patent Abstracts of Japan, vol. 1999, No. 04 (E-1453), Apr. 30, 1999 & JP 11017997, Jan. 22, 1999.

* cited by examiner

*Primary Examiner*—Ngoc-Yen T Vu
(74) *Attorney, Agent, or Firm*—Lisa K. Jorgenson; James H. Morris; Wolf, Greenfield & Sacks, P.C.

(57) ABSTRACT

Device comprising a camera module with automatic focusing itself comprising an optical chip (8) and an optical block (7), the optical block (7) integrating at least an objective (3), at least a focusing means (11) for adjusting the focus of the objective (3), the optical chip (8) integrating at least an image sensor (14) placed on a first face of a substrate of the optical chip (8). This optical chip (8) also includes a microprocessor (4) placed on the same substrate, receiving image signals originating from the image sensor (14) and generating a control signal based on the said image signals, that is applied to the said focusing means (11) to focus the objective (3).

22 Claims, 2 Drawing Sheets

DEVICE COMPRISING A CAMERA MODULE WITH AUTOMATIC FOCUSING AND CORRESPONDING ASSEMBLY METHOD

This invention relates to the domain of image sensors and more particularly camera modules comprising an image sensor, an objective and a micro-electromechanical focusing system placed above the image sensor. It is particularly but not exclusively applicable to still cameras, video cameras, mobile telephones and any other device integrating such a camera module.

More precisely, according to a first aspect, the invention relates to a device comprising a camera module with automatic focusing itself comprising an optical chip and an optical block, the optical block integrating at least an objective, at least a focusing means for adjusting the focus of the objective, the optical chip integrating at least an image sensor placed on a first face of a substrate of the optical chip.

A device of this type known in prior art is shown in FIG. 1. It is composed of an optical box 1 fixed on an intermediate printed circuit board 2 on which a microprocessor 4 is installed with the purpose of managing the optical box 1. The optical box 1 comprises an integrated circuit chip called an optical chip on which an image sensor and a micro-electromechanical focusing system, not shown in this Figure, are mounted. The Micro Electro-Mechanical System (MEMS) comprises an objective 3 composed of a set of mobile lenses and a motor used to focus the objective 3. The sensor senses images through the objective 3 and sends image signals to the microprocessor 4 through wire links 5 external to the optical box 1. The microprocessor 4 generates focusing control signals from these image signals and transmits them to the micro-electromechanical system also through external wire links 5. Furthermore, image signals from the image sensor, possibly pre-processed by the microprocessor 4, are sent to a main printed circuit board also called the mother board, through a multi-conductor cable 6 (shown as a flat cable in the Figure) also transmitting electrical power to the micro-electromechanical system, to the sensor and to the microprocessor 4.

Therefore, such a device requires a large number of external wire connections between the optical box, the intermediate printed circuit board and the main printed circuit board, which involves a large number of assembly operations and connections usually by soldering. The result is problems with complexity during production, reliability and also the size that limits miniaturization possibilities.

The purpose of this invention is to overcome these disadvantages.

In particular, one purpose of the invention is to take off at least some of the external connections and consequently to miniaturize the device, to increase the reliability and also to simplify the design and manufacturing by reducing the assembly steps.

To achieve this, the device according to the invention, which otherwise complies with the generic definition given in the above preamble, is characterized essentially in that the said optical chip also includes a microprocessor placed on the same substrate, receiving image signals originating from the said image sensor and generating a control signal based on the said image signals, that is applied to the said focusing means to focus the said objective.

Preferably, the said optical chip and the said optical block are provided with at least respective first and second contact areas facing each other and a means of fixing the said optical block to the said optical chip, the said first and second contact areas and the said fixing means assuring at least an electrical connection between the said microprocessor and the said focusing means.

Advantageously, the said fixing means is an anisotropic conductive paste inserted between the said first and second contact areas.

If the device includes a printed circuit board, the said optical chip is for example installed on the printed circuit board by at least an electrical connection transferring electrical power from the said printed circuit board to the said optical chip and to the said optical block.

In the same case in which the device comprises a printed circuit board, the said optical chip is for example installed on the said printed circuit board by at least an electrical connection providing the transfer of said image signals between the said printed circuit board and the said optical chip.

The said optical connection may include at least a through metallic interconnection placed in the said substrate of the said optical chip and at least a connection ball fixed on one end of the said through metallic interconnection appearing on a second face of the substrate opposite the said first face of the said optical chip.

Another purpose of this invention is a method for mounting a camera module comprising an optical block and an optical chip, both provided with first and second contact areas facing each other, the said optical block also including at least one focusing means and at least one objective, the said optical chip also including at least one image sensor placed on a first face of a substrate and at least one microprocessor placed on the same face, the method consisting of inserting an anisotropic conducting glue between the said first and second contact areas of the said optical chip and the said optical block for the transmission of signals and/or the power supply.

Advantageously, the method includes a step for fixing at least one connection ball to one end of a through metallic interconnection located in the substrate and appearing on a second face of the said substrate opposite the said first face, and a step to attach and connect the said camera module on a printed circuit board using the said connection ball.

These and other purposes, special features and advantages of this invention will be presented in greater detail in the following description of a preferred embodiment of the invention given as a non-limitative example with reference to the figures, wherein:

FIG. 1, already described, shows a camera module known according to prior art;

FIG. 2 shows a schematic diagram of a camera module according to the invention;

FIG. 3 shows an exploded sectional view of components of the camera module according to the invention;

FIG. 4 shows a sectional view of the camera module shown in FIG. 3.

With reference to the diagram shown in FIG. 2, the optical device according to the invention comprises a camera module and a printed circuit board called the mother board 19. The camera module includes two main parts: an optical block 7 also called MEMS and an integrated circuit chip called an optical chip 8. In particular, the optical block 7 comprises an objective 3 composed of a set of lenses that are at least partly mobile and focusing means 11, for example including a motor and gears to adjust the position of the mobile lenses of the objective 3. The optical chip 8 comprises an image sensor 14 and a microprocessor 4 according to the invention.

The image sensor 14 sends image signals to the microprocessor 4 through a connection 21 onto the substrate of the optical chip 8. The microprocessor 4 processes these image signals in advance, and firstly sends processed image signals to the mother board 19 and also generates a control signal based on these image signals addressed to the focusing means 11 to focus the objective 3. The optical chip 8 and the focusing means 11 receive sufficient electrical power output from the mother board 19 through the optical chip 8.

Image signals, control signals and electrical power are transferred between the optical block 7, the optical chip 8 and the mother board 19 through connections internal to the camera module, produced using the method illustrated in FIG. 3.

Thus with reference to FIG. 3, the image sensor 14 and the microprocessor 4 are mounted on a first face of a semiconducting substrate (for example silicon), on the optical chip 8. It comprises through metallic interconnections 15 known as "vias" to those skilled in the art, passing through the substrate. These vias 15 associated with connection balls 18 fixed on the ends of these vias appearing on a second face of the substrate opposite the first face, transfer the electrical power necessary to the optical chip 8 and to the focusing means 11, and transfer image signals between the microprocessor 4 and the mother board 19.

The optical block 7 comprises firstly an objective 3 including mobile lenses free to move along a rack 10 (a single lens is shown in the Figure for reasons of simplicity), and secondly focusing means 11 for example comprising a motor and gears for adjusting the position of lenses free to move along the rack 10, and motor connection elements 13 for transmission of the necessary electrical power and control signals originating from the microprocessor 4. The set of elements in the optical block is integrated into a housing 9 acting as an optical cache for the image sensor and as a support for the objective 3 and the focusing means 11. For example, the housing 9 is made of opaque polycarbonate and have a frontal objective aperture 12.

The optical chip 8 and the optical block 7 are provided with first and second contact areas 17*a*, 17*b* facing each other.

The electrical connections between the optical block 7 and the optical chip 8 are provided with an attachment means 16 also fixing these two elements. This attachment means 16, for example composed of an anisotropic conducting glue, is inserted between the first and second contact areas 17*a*, 17*b*. The result is the device shown in FIG. 4.

Thus, integration of the microprocessor 4 on the optical chip 8 provides a means of also integrating all connections firstly between the optical block 7 and the optical chip 8, and secondly between the optical chip 8 and the mother board 19.

The invention claimed is:

1. A camera module with automatic focusing comprising:
    an optical chip and an optical block mounted to the optical chip, the optical block having a housing that mounts the optical block, as a unit, to the optical chip and that houses an objective and a focusing mechanism to move the objective within the optical block to adjust a focus of the camera module, the optical chip having an image sensor on a first face of a substrate of the optical chip,
    wherein the optical chip also includes a microprocessor on the substrate, to receive image signals originating from the image sensor and to generate a control signal based on the image signals, that is applied to the focusing mechanism to focus the objective through a direct electrical connection between the microprocessor of the optical chip and the focusing mechanism of the optical block.

2. The camera module according to claim 1, wherein the optical chip and the optical block are provided with at least respective first and second contact areas facing each other and a means of fixing the optical block to the optical chip, the first and second contact areas and the fixing means providing the direct electrical connection between the microprocessor of the optical chip and the focusing mechanism of the optical block.

3. The camera module according to claim 2, wherein the fixing means is an anisotropic conductive paste inserted between the first and second contact areas, the anisotropic conductive paste adapted to transmit control signals directly between the microprocessor of the optical chip and the focusing mechanism of the optical block.

4. The camera module according to claim 1, further comprising:
    a printed circuit board, wherein the optical chip is installed on the printed circuit board by at least an electrical connection that transfers electrical power from the printed circuit board to the optical chip and to the optical block.

5. The camera module according to claim 4, wherein the electrical connection includes at least a through metallic interconnection placed in the substrate of the optical chip and at least a connection ball fixed on one end of the through metallic interconnection at a second face of the substrate that is opposite the first face of the optical chip.

6. The camera module according to claim 1, further comprising:
    a printed circuit board, wherein the optical chip is installed on the printed circuit board by at least an electrical connection that transfers the image signals between the printed circuit board and the optical chip.

7. The camera module according to claim 6, wherein the electrical connection includes at least a through metallic interconnection placed in the substrate of the optical chip and at least a connection ball fixed on one end of the through metallic interconnection and present on a second face of the substrate opposite the said first face of the said optical chip.

8. The camera module of claim 1, wherein the focusing mechanism includes a motor.

9. A still camera comprising the camera module of claim 1.

10. A video camera comprising the camera module of claim 1.

11. A mobile telephone comprising the camera module of claim 1.

12. A method for manufacturing a camera module with automatic focusing, the method including:
    fabricating an optical block having a housing that houses at least an objective and at least a focusing mechanism to move the objective within the optical block to adjust the focus of the camera module;
    fabricating an optical chip with a substrate and at least an image sensor placed on a first face of the substrate of the optical chip;
    integrating a microprocessor on the substrate, the microprocessor programmed to:
        receive image signals originating from the image sensor;
        generate a control signal based on the image signals; and
        apply the control signal to the focusing mechanism to focus the objective through a direct electrical connection between the microprocessor of the optical chip and the focusing mechanism of the optical block; and
    mounting the housing of the optical block to the optical chip.

13. The method according to claim 12, further comprising:
    inserting a conductive paste between the optical chip and the optical block at first and second areas, the conductive paste adapted to transmit control signals directly between the microprocessor of the optical chip and the focusing mechanism of the optical block.

14. The method according to claim 12, further comprising:

fixing at least a connection ball to one end of a through metallic interconnection located in the substrate and present on a second face of the substrate opposite the first face; and attaching and connecting the camera module on a printed circuit board using the connection ball.

15. The method of claim 12, wherein fabricating an optical block comprises providing a focusing mechanism having a motor.

16. A camera module with automatic focusing, the camera module comprising:

an optical block comprising a housing that houses an objective and a motor to position the objective within the optical block, the motor and the objective integrated into the optical block; and an optical chip comprising a substrate with an image sensor and a microprocessor that receives image signals from the image sensor and that controls the motor to position the objective;

wherein the housing of optical block is mounted directly to the optical chip in a manner that provides direct electrical connection adapted to transmit control signals and electrical power between the optical block and optical chip without external wires.

17. The camera module of claim 16, wherein the optical chip includes one or more vias to provide an electrical connection from a printed circuit board to the optical block.

18. The camera module of claim 16, wherein the optical block includes a first mounting face and the optical chip includes a second mounting face configured to mate with the first mounting face, further wherein the first mounting face has a first and a second contact area to engage a corresponding first and second contact areas on the second mounting face.

19. The camera module of claim 18, wherein an anisotropic paste is positioned at each of the first and second contact areas of the first and second mounting faces to provide the direct electrical connection adapted to transmit control signals and electrical power between the optical chip and the optical block.

20. The camera module of claim 16, wherein the direct electrical connection is adapted to transmit control signals between the microprocessor of the optical chip and the focusing mechanism of the optical block.

21. A method for manufacturing a camera module with automatic focusing, the method comprising:

providing an optical block that includes a housing;

integrating into the housing of the optical block both an objective and a motor to position the objective within the optical block;

providing an optical chip having a substrate;

integrating into the substrate both an image sensor and a microprocessor to receive image signals from the image sensor and to control the motor to position the objective; and connecting the housing of the optical block and the optical chip to engage one another in a manner that provides direct electrical connection adapted to transmit control signals and electrical power between the optical block and the optical chip without external wires.

22. The method of claim 21, wherein the direct electrical connection is adapted to transmit control signals between the microprocessor of the optical chip and the focusing mechanism of the optical block.

* * * * *

UNITED STATES PATENT AND TRADEMARK OFFICE
CERTIFICATE OF CORRECTION

| | |
|---|---|
| PATENT NO. | : 7,893,992 B2 |
| APPLICATION NO. | : 11/351352 |
| DATED | : February 22, 2011 |
| INVENTOR(S) | : Julien Vittu |

It is certified that error appears in the above-identified patent and that said Letters Patent is hereby corrected as shown below:

On the title page, the Abstract should read:
(57) ABSTRACT
Device including a camera module with automatic focusing including an optical chip and an optical block, the optical block integrating at least an objective, at least a focusing circuit for adjusting the focus of the objective, the optical chip integrating at least an image sensor placed on a first face of a substrate of the optical chip. This optical chip also includes a microprocessor placed on the same substrate, receiving image signals originating from the image sensor and generating a control signal based on the said image signals, that is applied to the said focusing means to focus the objective.

Col. 1, line 4, insert heading:
--BACKGROUND OF THE INVENTION--

Between lines 4 and 5, insert the sub-heading:
--1. Field of the Invention--

Line 5 should read:
This invention relates to image sensors and more

Between lines 18 and 19, insert the sub-heading:
--2. Discussion of the Related Art--

Lines 37-38 should read:
through a multi-conductor cable 6 (shown as a flat cable in Figure 1)

Between lines 48 and 49, insert:
--Summary of the Invention--

Signed and Sealed this
Third Day of May, 2011

David J. Kappos
*Director of the United States Patent and Trademark Office*

Line 49 should read:

A purpose of this invention is to overcome these disad-

Col. 1 line 56 to col. 2, line 39 should read:

To achieve at least this, the device according to the invention includes a microprocessor placed on the same substrate, receiving image signals originating from the image sensor and generating a control signal based on the image signals, that is applied to the focusing means to focus the objective.

Preferably, the optical chip and the optical block are provided with at least respective first and second contact areas facing each other and a means of fixing the optical block to the optical chip, the first and second contact areas and the fixing means assuring at least an electrical connection between the microprocessor and the focusing means.

Advantageously, the fixing means is an anisotropic conductive paste inserted between the first and second contact areas.

If the device includes a printed circuit board, the optical chip is, for example, installed on the printed circuit board by at least an electrical connection transferring electrical power from the printed circuit board to the optical chip and to the optical block.

In the same case in which the device comprises a printed circuit board, the optical chip is, for example, installed on the printed circuit board by at least an electrical connection providing the transfer of image signals between the printed circuit board and the optical chip.

The optical connection may include at least a through metallic interconnection placed in the substrate of the optical chip and at least a connection ball fixed on one end of the through metallic interconnection appearing on a second face of the substrate opposite the first face of the optical chip.

Another purpose of the invention is a method for mounting a camera module comprising an optical block and an optical chip, both provided with first and second contact areas facing each other, the optical block also including at least one focusing means and at least one objective, the optical chip also including at least one image sensor placed on a first face of a substrate and at least one microprocessor placed on the same face, the method comprising inserting an anisotropic conducting glue between the first and second contact areas of the optical chip and the optical block for the transmission of signals and / or the power supply.

Advantageously, the method includes a step for fixing at least one connection ball to one end of a through metallic interconnection located in the substrate and appearing on a second face of the substrate opposite the first face, and a step to attach and connect the camera module on a printed circuit board using the connection ball.

Between lines 39 and 40, insert the heading:

--Brief Description of the Drawings--

Line 40 should read.

Figure 1:
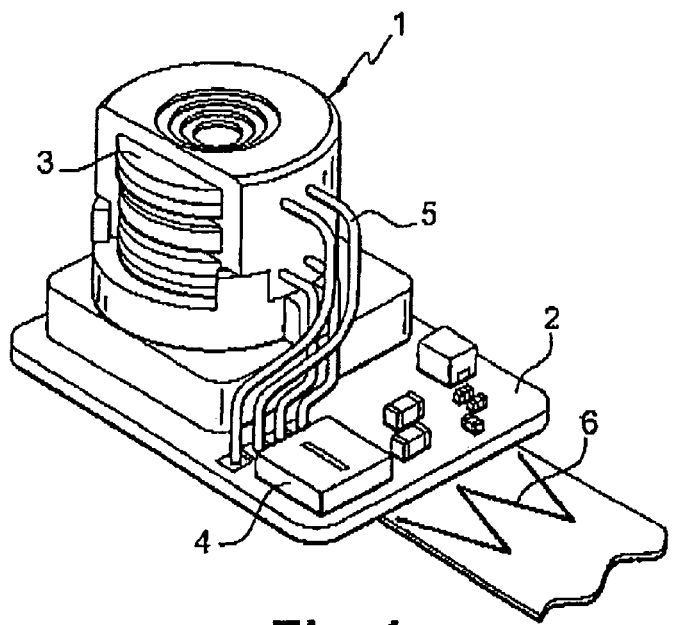
Figure 1, already described, shows a camera module according to prior art.
Figure 2:
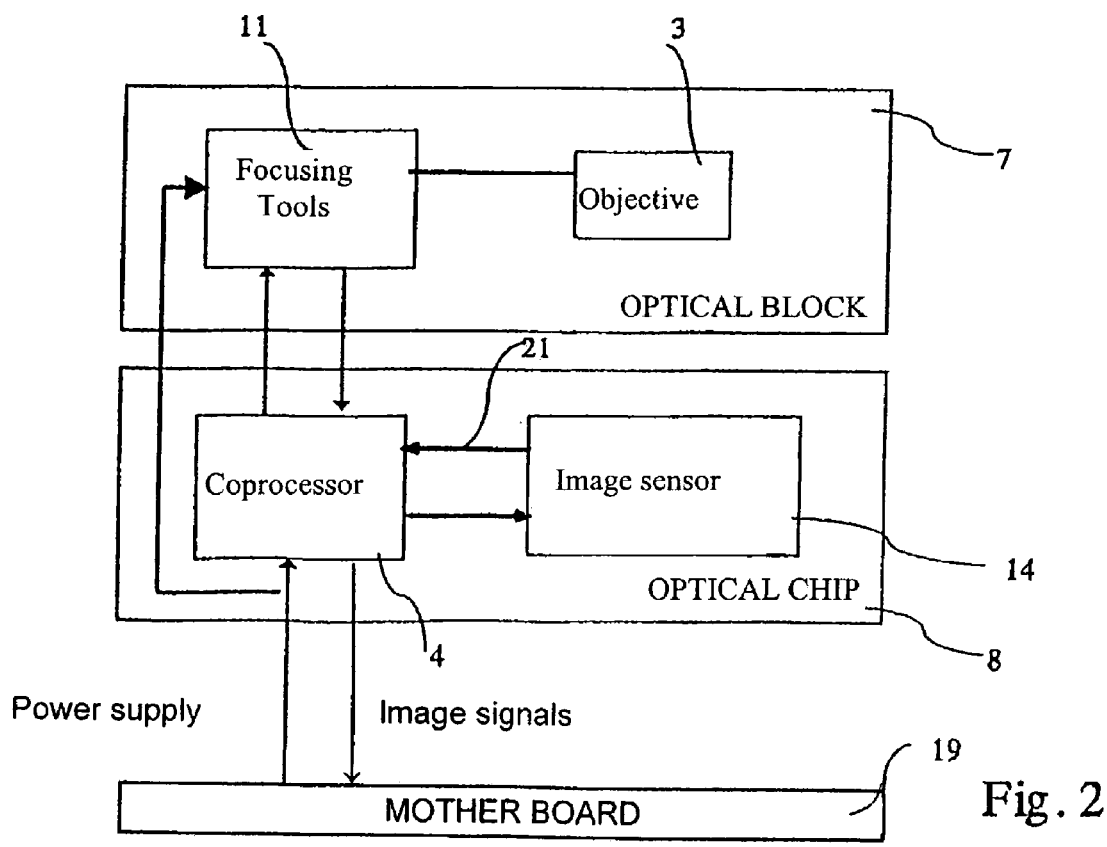
Figure 3:
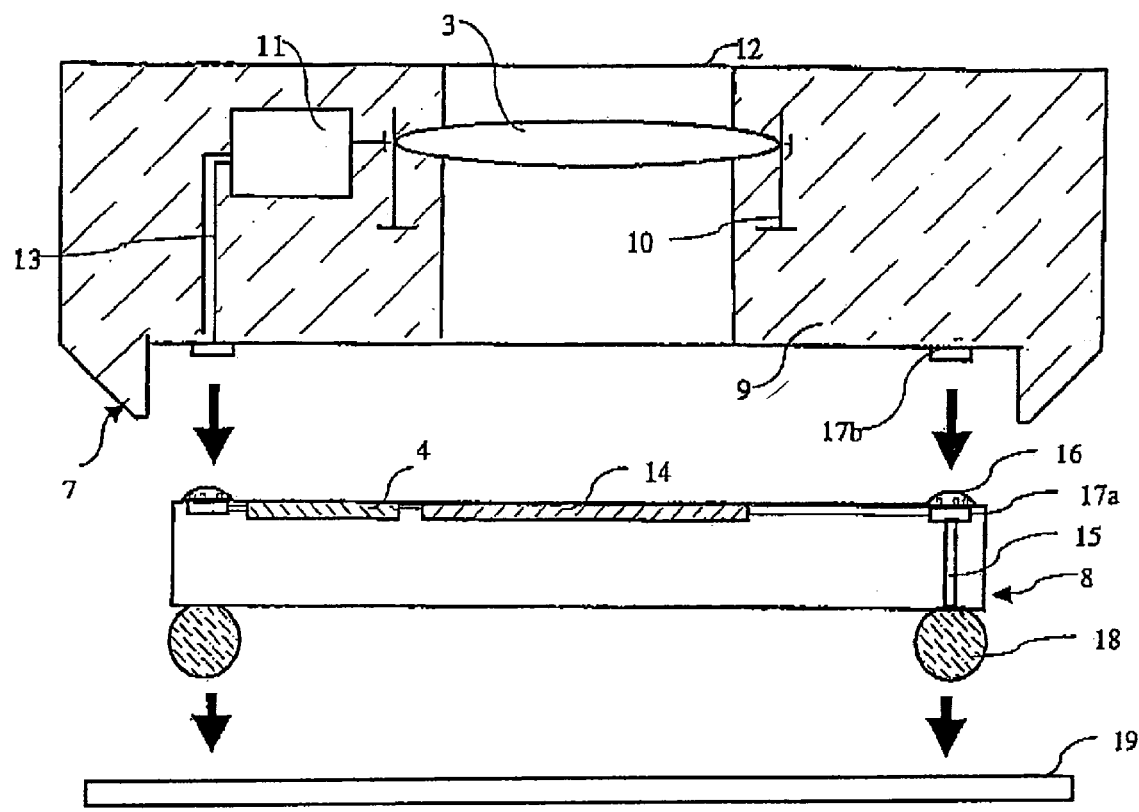
Figure 4:
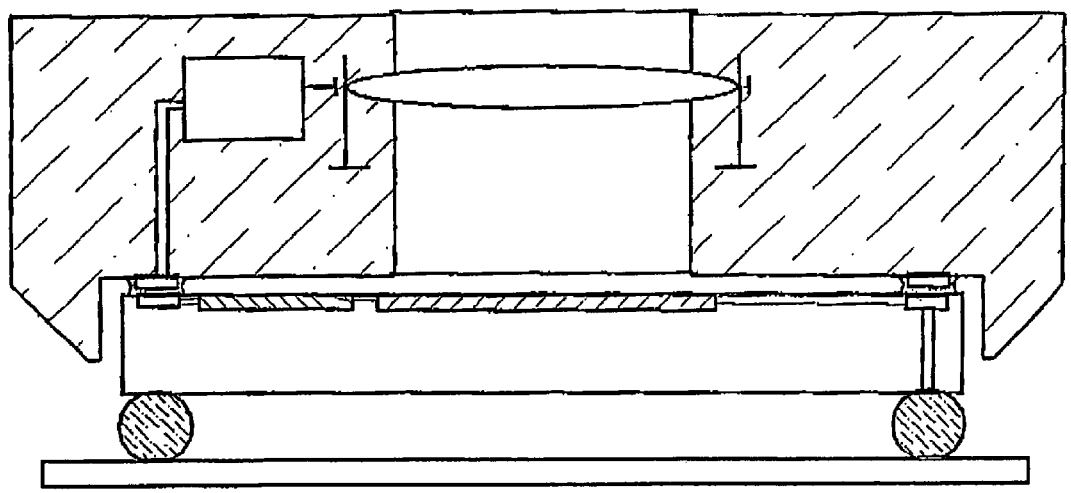

Col. 3, after line 45, insert the following paragraph.

--Having thus described at least one illustrative embodiment of the invention, various alterations, modifications, and improvements will readily occur to those skilled in the art. Such alterations, modifications, and improvements are intended to be within the scope of the invention. Accordingly, the foregoing description is by way of example only and is not intended as limiting. The invention is limited only as defined in the following claims and the equivalents thereto.--

Line 46 should read:
What is claimed is: